United States Patent [19]

Stillabower

[11] Patent Number: 5,119,686

[45] Date of Patent: Jun. 9, 1992

[54] CONSTANT BREADTH CAMBOX

[75] Inventor: Morris D. Stillabower, Tipton, Ind.

[73] Assignee: Delco Electronics Corporation, Kokomo, Ind.

[21] Appl. No.: 695,834

[22] Filed: May 6, 1991

[51] Int. Cl.$^5$ .................. F16H 19/06; F16H 53/06
[52] U.S. Cl. .................................. 74/37; 74/55; 74/569; 414/733
[58] Field of Search ............ 74/37, 55, 56, 57, 569; 414/733, 905

[56] References Cited

U.S. PATENT DOCUMENTS

| | | | |
|---|---|---|---|
| 1,205,895 | 12/1915 | Hoyt . | |
| 1,890,781 | 12/1932 | Hall et al. | 74/37 |
| 2,374,215 | 4/1945 | Korenyi | 74/37 |
| 2,523,231 | 9/1950 | Pianta et al. | 74/37 |
| 2,528,286 | 10/1950 | Pianta et al. | 74/37 |
| 2,564,816 | 8/1951 | Rehwald | 74/37 |
| 2,759,366 | 8/1956 | Reid | 74/55 |
| 3,066,330 | 12/1962 | Howe et al. | 74/569 X |
| 3,902,606 | 9/1975 | Ronbeck | 214/1 |
| 4,016,984 | 4/1977 | Pipes | 214/1 |
| 4,018,328 | 4/1977 | Galarowic et al. | 198/741 |
| 4,474,284 | 10/1984 | Powell et al. | 198/742 |
| 4,634,338 | 1/1987 | Tsuge et al. | 414/752 |
| 4,740,134 | 4/1988 | Dixon | 414/733 |
| 4,993,275 | 2/1991 | Pollich et al. | 74/569 X |

Primary Examiner—Allan D. Herrmann
Assistant Examiner—David W. Laub
Attorney, Agent, or Firm—Patrick M. Griffin

[57] ABSTRACT

A worktool transfer apparatus for moving a worktool along a recirculating path includes a chain moveably supported by two spaced sprockets of equal diameter. A motor rotates one of the sprockets to cause circulating movement of the chain. A constant breadth velocity cam is fixedly attached to one of the chain links so that the rotational center of the velocity cam is aligned with the rotational centers of each of the sprockets as the link to which the velocity cam is attached moves about the periphery of each sprocket. Four rollers extend from the cam and ride along an oval track for maintaining orientation of the velocity cam as it moves with the chain. A cross bearing block is moved linearly back and forth by the velocity cam. A worktool is attached to and moves with the cross bearing block and is independently moveable laterally of the cross bearing block.

2 Claims, 11 Drawing Sheets

CONSTANT BREADTH CAMBOX

TECHNICAL FIELD

The subject invention relates to transfer machines, and more particularly to chain driven transfer machines having equal stroke lengths.

BACKGROUND ART

In manufacturing processes, transfer apparatus are used to create repeated mechanical motions for production equipment such as walking beams, pick and place movements, oscillating drives, and the like. These mechanical motions are carried out in a single plane and are characterized by requiring a high horizontal stroke to vertical stroke ratio.

Typically, the long horizontal stroke is accomplished by a large barrel cam or a large plate cam having linkages attached to the cam followers for driving the worktool along the repeating and recirculating path. When extremely long horizontal strokes are required, stroke doubling gear and belt mechanisms are frequently employed.

The prior art transfer apparatus are particularly deficient in that the conventional long stroke cam motions require large cam sizes and long length linkages and levers to drive the worktool. The large cams have inherently high inertia requiring high torque inputs. The long linkages and levers tend to magnify any errors occurring in the manufacture of the lever or linkages, and errors due to wear.

SUMMARY OF THE INVENTION AND ADVANTAGES

The subject invention provides a transfer apparatus for moving a worktool along a repeating general plane path. The apparatus comprises a rotary drive wheel having an effective periphery defined by a drive pitch radius, an idler support having at least a semicircular periphery defined by a support radius equal to the drive pitch radius, a flexible endless driven element supported for circulating movement about the peripheries of the drive wheel and the idler support, motor means for rotating the drive wheel at a substantially constant angular velocity to impart a substantially constant linear velocity to the driven element, and follower means for moving the worktool along a reciprocating path in response to movement of the driven element. The invention is characterized by a cam means fixed to a discrete point on the driven element and operatively engaging the follower means for alternately and smoothly decelerating and smoothly accelerating the movement of the follower means between the linear velocity of the driven element and zero velocity as the discrete point on the driven element moves about the peripheries of the drive wheel and the idler support to smoothly reverse direction of the worktool.

The subject invention uniquely combines the endless, i.e., continuous, driven element with the intermittent motion of the cam means to drive the follower means and the attached worktool through a recycling, repeating motion The subject invention overcomes the disadvantages in the prior art by providing a transfer apparatus with few moving parts, having a minimum horizontal stroke limited only by how close the drive wheel and the idler support can be set in relation to each other, and having a theoretically unlimited maximum horizontal stroke. Perhaps more importantly, any error due to manufacturing or wear of the components is not magnified because the prior art levers and linkages are not employed to transfer motion between the driven element and the worktool Hence, a more reliable and more precise transfer apparatus is provided.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT OF FIGS. 1-16

Referring to FIGS. 1-16, wherein like numerals indicate like or corresponding parts throughout the several views, a transfer apparatus is generally shown at 20. The apparatus 20 is of the type for moving a worktool 22 along a repeating general plane path. The worktool 22 may comprise the moving portion of a walking beam, as shown in FIGS. 1 and 2, or in the alternative may function as a pick and place tool, an oscillating drive, or any other member having a cyclic path in a single plane.

Figure 1:
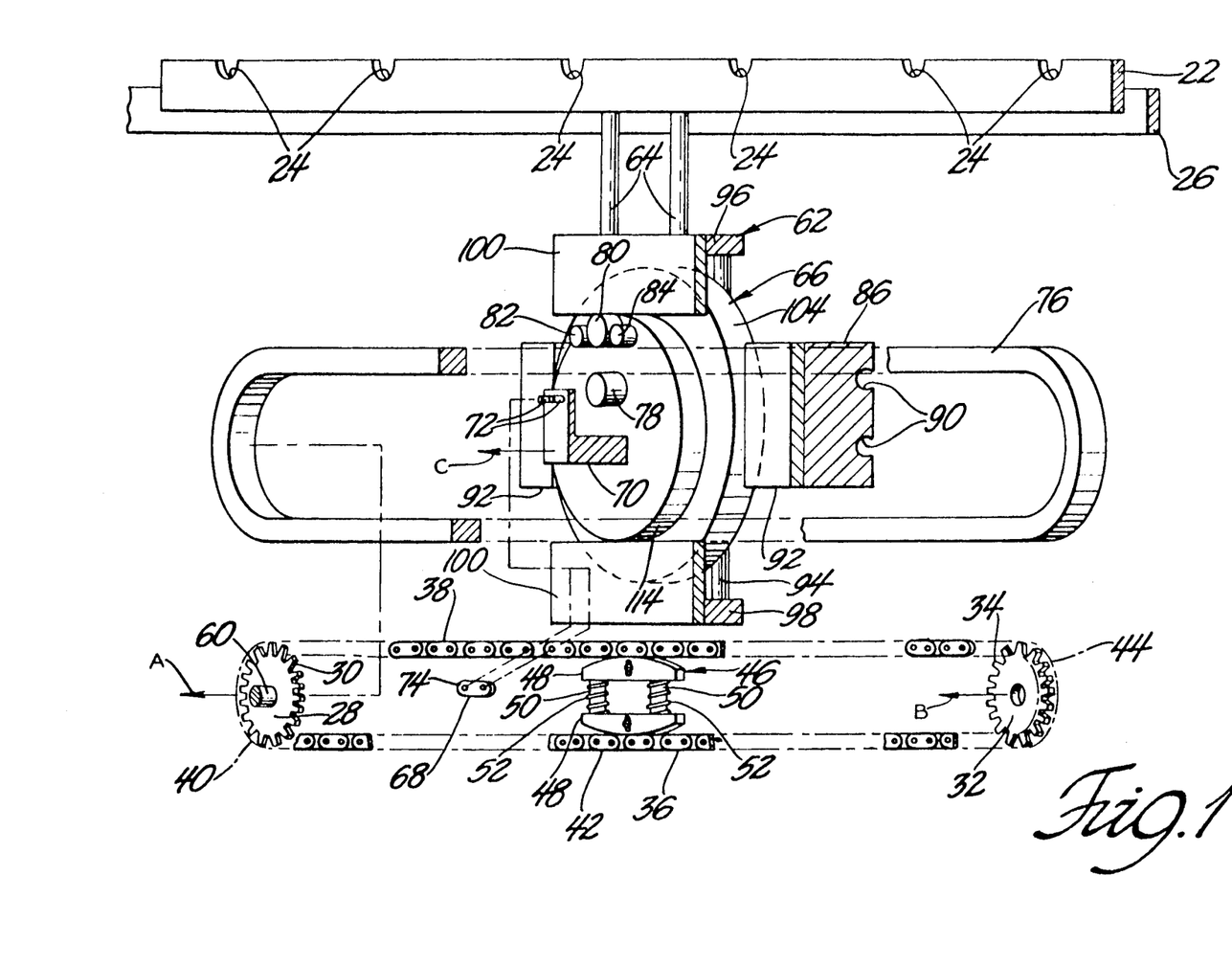
FIG. 1 is a simplified somewhat diagrammatic exploded view of a transfer apparatus according to the subject invention.
Figure 2:
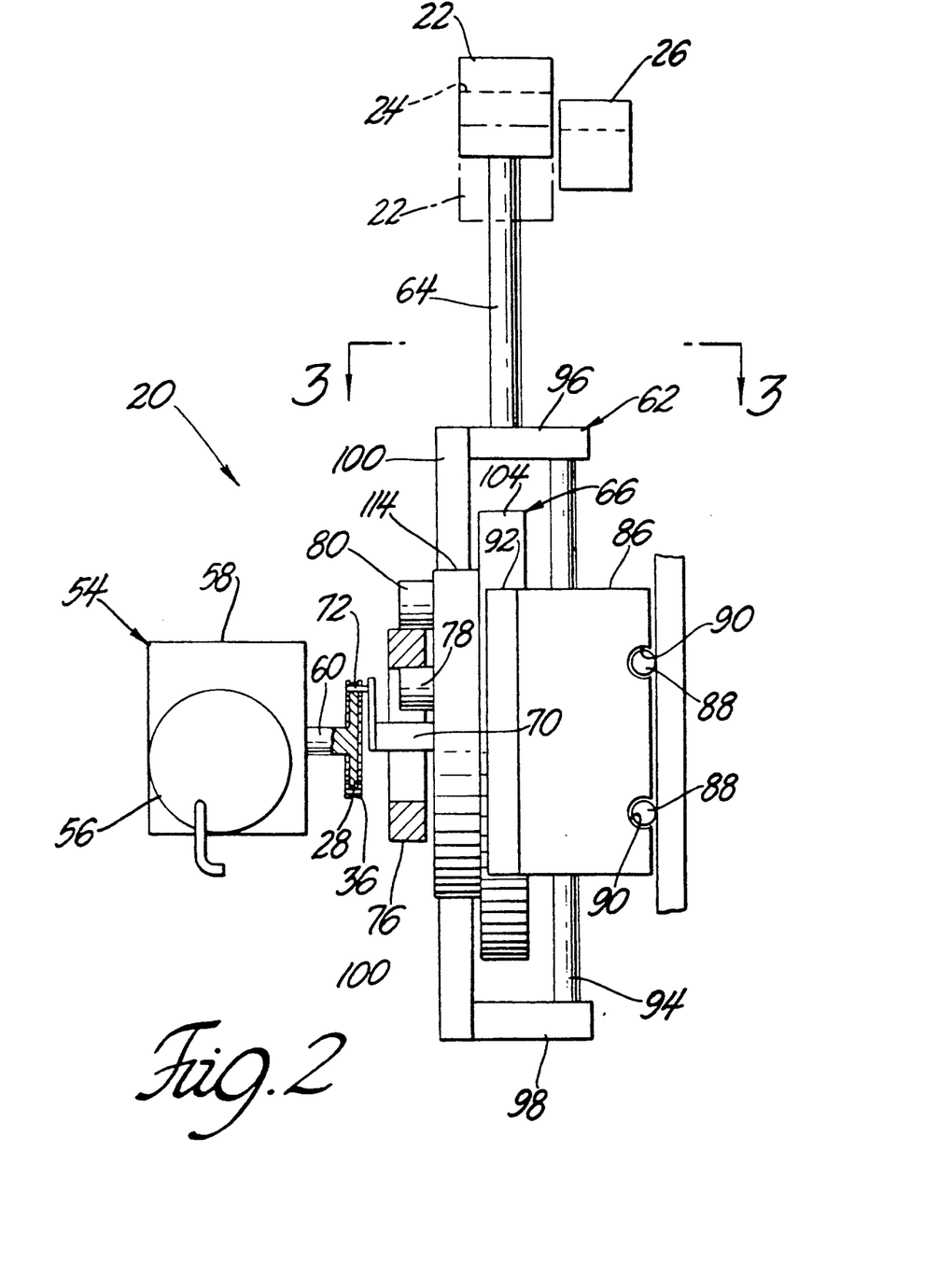
FIG. 2 is an end view of the subject assembly disposed for operation.
Figure 4:
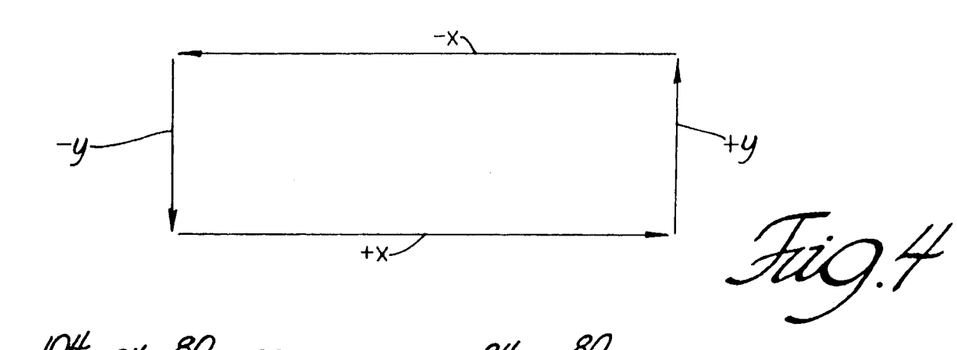
FIG. 4 is a diagrammatic view of the repeating general plane path imparted to the worktool by the subject invention.

The walking beam type worktool 22 shown in FIGS. 1 and 2 is a highly simplified representation of the typical walking beam, and includes a plurality of workpart supporting seats 24 disposed in equally spaced increments along the upper surface of the worktool 22. The moveable worktool 22 is disposed adjacent a parallel static beam 26 having corresponding workpart seats for sequentially moving the workparts along the static beam in response to the movement of the worktool 22. A diagrammatic representation of the rectangular path motion imparted to the worktool 22 by the subject transfer apparatus 20 is shown in FIG. 4.

Figure 3:
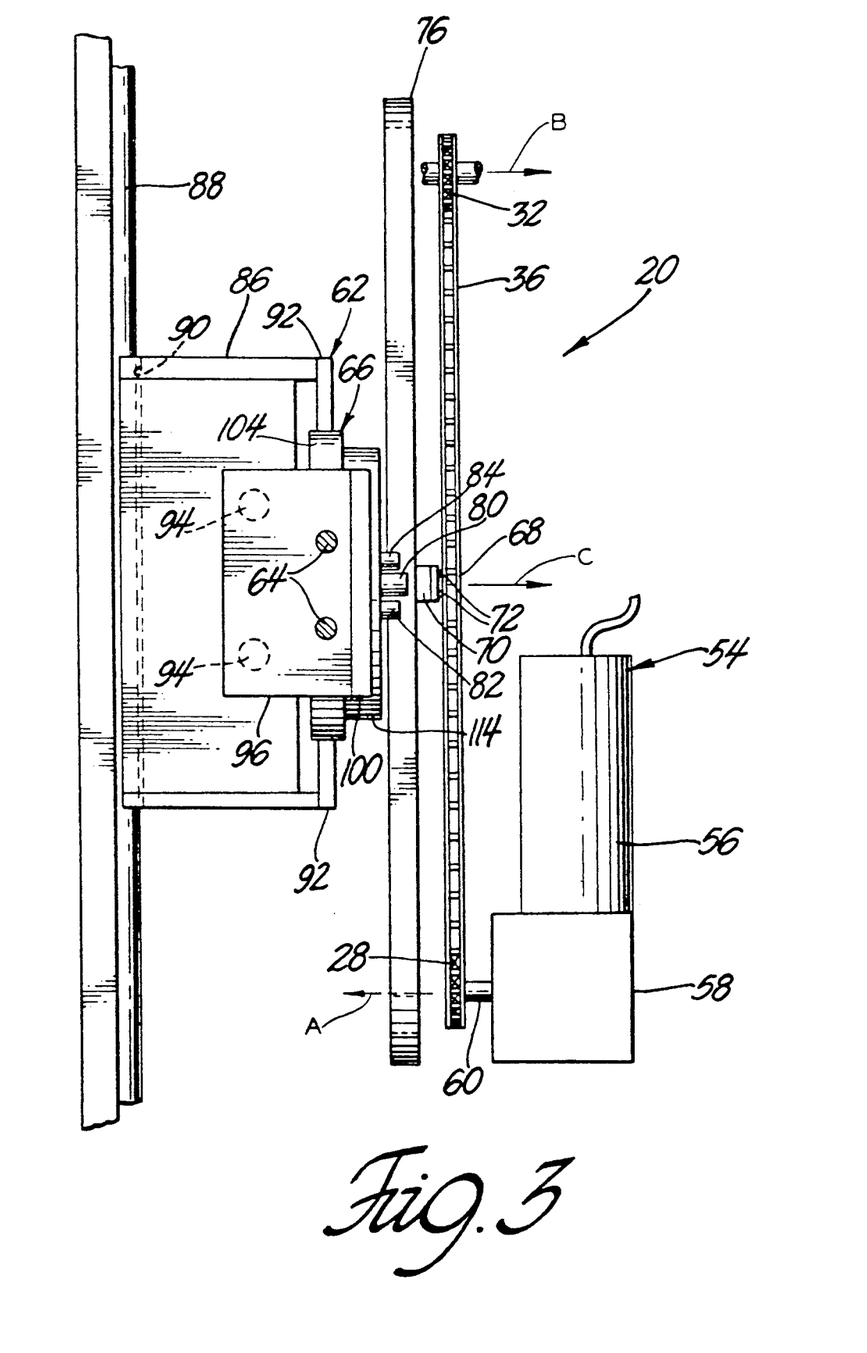
FIG. 3 is a sectional top view of the subject assembly as taken along lines 3—3 in FIG. 2.

The subject apparatus 20 includes a rotary drive wheel 28 which, in the preferred embodiment, comprises a typical roller chain sprocket as shown in FIG. 1. In typical fashion, the sprocket 28 includes a plurality of radially extending teeth 30. Although the periphery of the sprocket 28 is not circular due to the radially extending teeth 30, an effective periphery is defined by a drive pitch radius forming a pitch circle, which pitch circle is the theoretical circle upon which all calculations as to the operating characteristics of the sprocket 28 are based. The drive pitch radius is hereinafter represented by the reference character Rs for mathematical purposes. The drive sprocket 28 is supported for rotation about a fixed axis A, as shown in FIGS. 1 and 3.

An idler support 32 is horizontally spaced from the drive sprocket 28 and has at least a semi-circular periphery defined by a support radius equal to the drive pitch radius Rs of the drive sprocket 28. More specifically, the idler support 32 also comprises a typical roller chain sprocket having a plurality of radially extending teeth 34. The idler sprocket 32 has an effective periphery comprising a pitch circle. The pitch radius of the idler sprocket pitch circle is equivalent to the drive pitch radius Rs of the drive sprocket 28. Accordingly, the number of teeth 30 surrounding the drive sprocket 28 is equivalent to the number of teeth 34 surrounding the idler sprocket 32. The idler sprocket 32 is supported for free rotation about a fixed axis B extending parallel to the drive sprocket axis A. The distance between the idler sprocket axis B and the drive sprocket axis A is fixed in regard to a particular stroke length of the worktool 22. Therefore, as the stroke length changes, the distance between the axes A, B is varied accordingly.

A flexible endless driven element 36 is supported for circulating movement about the peripheries of the drive sprocket 28 and the idler sprocket 32. More specifically, the driven element 36 comprises a roller chain having a plurality of alternating pin links and roller links disposed for operative engagement between the teeth 30, 34 of the respective drive sprocket 28 and idler sprocket 32. Therefore, the driven element 36 forms the shape of an elongated oval supported between the drive 28 and idler 32 sprockets, as shown in FIG. 1. The oval shape of the driven element 36 comprises a straight upper segment 38 formed tangentially between the upper extremities of the sprockets 28, 32, a left semi-circular segment 40 (shown in phantom) formed about the left outer edge of the drive sprocket 28, a straight lower segment 42 formed tangentially between the lower extremities of the sprockets 28, 32, and a right semi-circular segment 44 (shown in phantom) formed about the outer periphery of the idler sprocket 32.

A chain tensioner, generally indicated at 46 in FIG. 1, is disposed between the straight upper segment 38 and straight lower segment 42 of the driven element 36, generally midway between the drive sprocket axis A and the idler sprocket axis B. The chain tensioner 46 includes a pair of shoes 48 respectively engaging the straight upper segment 38 and the straight lower segment 42 of the driven element 36. The shoes 48 are slideably disposed relative to one another on a pair of guide rods 50. A compression spring 52 is disposed about each guide rod 50 for exerting an outward force on each shoe 48 tending to separate the straight upper segment 38 from the straight lower segment 42 of the driven element 36, and thereby maintain an even tension along the driven element 36.

Referring now to FIGS. 2 and 3, a motor means, generally indicated at 54, is provided for rotating the drive sprocket 28 at a substantially constant angular velocity to impart a substantially constant linear velocity to the driven element 36. More particularly, the motor means 54 includes an electric motor 56 operatively coupled to a mechanical gear reduction box 58. An output shaft 60 extends from the gear reduction box 58 and is fixedly attached to the drive sprocket 28 for rotating the drive sprocket 28 about its axis A. Accordingly, as the drive sprocket 28 is rotated, the teeth 30 engage between the roller links of the driven element 36 and cause recirculating movement of the driven element 36 at a constant linear velocity.

A follower means, generally indicated at 62 in FIGS. 1-3, is provided for moving the worktool 22 along its reciprocating path in response to movement of the driven element 36. As shown in FIGS. 1 and 2, a pair of rigid columns 64 extend vertically to interconnect the follower means 62 and the worktool 22. A cam means, generally indicated at 66, is fixed to a discrete point 68 on the driven element 36 and operatively engages the follower means 62 for alternately smoothly decelerating and smoothly accelerating the movement of the follower means 62 between the linear velocity of the driven element 36 and zero velocity as the discrete point 68 on the driven element 36 moves about the peripheries of the drive sprocket 28 and the idler sprocket 32 to smoothly reverse direction of the worktool 22. That is, as the discrete point 68 of the driven element 36 moves through the straight upper segment 38, the cam means 66 is forced to move at a matching linear velocity thereby moving the associated follower means 62 and the attached worktool 22 together at the same linear velocity as the discrete point 68 of the driven element 36. However, as the discrete point 68 begins to move around either the left semi-circular segment 40 or the right semi-circular segment 44, depending upon the direction the driven element 36 is forced to move, the cam means 66 begins to rotate and in so doing first smoothly decelerates the follower means 62 from the linear velocity of the discrete point 68 to zero velocity, and then reaccelerates the follower means 62 from zero velocity to the linear velocity of the discrete point 68 so that the direction of the worktool 22 can be reversed without abrupt, jerky stops.

As perhaps more easily appreciated by reference to FIG. 4, wherein diagrammatic arrows indicate the directional movement of the worktool 22, the worktool 22 moves along the −x arrow at the linear velocity of the discrete point 68. At the end of the movement in the −x direction, the cam means 68 gradually slows the follower means 68 to a stop, after which the worktool 22 is moved downwardly in the −y direction. After completing its downward movement, the worktool 22 is reaccelerated in the +x direction to the linear velocity of the discrete point 68 and moves in the +x direction until it is once again decelerated to zero velocity and begins to move upwardly in the +y direction. Upon completing upward movement in the +y direction, the follower means 62 is reaccelerated to the linear velocity of the discrete point 68 where the cycle is continuously repeated.

The cam means 66 has an axis of rotation C parallel at all times to the respective sprocket axes A, B. An L-shaped crank arm 70, best shown in FIG. 1, extends from the cam means 66 and interconnects with the discrete point 68 on the driven element 36 so that as the discrete point 68 rotates about the drive sprocket 28 and the idler sprocket 32, the cam axis C is forced to coincide with the respective sprocket axes A, B. In order to more conveniently attach the crank arm 70 to the driven element 36, the discrete point 68 is chosen to be the master link connecting two loose ends of the driven element 36. Accordingly, a pair of pins 72 are spaced from one another a distance equal to the chain link pitch of the driven element 36. The two pins 72 extend outwardly from the crank arm 70, parallel to the cam axis C, as shown in FIG. 1. The loose ends of the driven element 36 are then pulled together and fastened over the pins 72, with a locking plate 74 providing a retainer. In this manner, the driven element 36 and the crank arm 70 of the cam means 66 are fixed to one another so that the distance between the cam axis C and the pins 72 is equivalent to the driven pitch radius Rs of the drive sprocket 28 and the pitch radius of the idler sprocket 32. Therefore, as the discrete point 68 moves about the sprockets 28, 32, the cam means 66 is forced to rotate precisely about the sprocket axes A, B, respectively.

To ensure that the cam means 66 does not rotate as the discrete point 68 moves through the straight upper segment 38 and the straight lower segment 42 of the driven element 36, and to ensure that the cam means 66 rotates perfectly about the respective sprocket axes A, B as the discrete point 66 moves through the left semi-circular segment 40 and the right semi-circular segment 44, an oval guide track 76 is provided. As shown in FIG. 1, an inner roller 78 extends from the cam means 66 and rollably engages the inner surface of the track 76. Similarly, an outer roller 80 is radially aligned with the inner roller 78 and extends from the cam means 66 to rollably engage the outer surface of the track 76. A pair of flanking rollers 82, 84 extend from the cam means 66, adjacent the outer roller 80, for rollably engaging the outer surface of the track 76 to further stabilize the cam means 66.

The cam means 66, therefore, translates with the driven element 36 until pins 72 on the crank arm 70 move into close proximity with the drive sprocket 28 and idler sprocket 32, where rotation is induced about the respective axes A, B. The factors inducing rotation of the cam means 66 include the chordal action of the chain links wrapping about the sprockets 28, 32, the rollers 78, 80, 82, 84 following the track 76, and the impact of the system inertia on the cam means 66 at each end of the stroke.

The follower means 62 includes a cross bearing block 86 restricted to horizontal sliding movement by a pair of rails 88, as shown in FIGS. 2 and 3. A pair of elongated slots 90 are disposed along the back side of the cross bearing block 86 for receiving and surrounding the rails 88. Open style recirculating ball bearings are disposed in each of the slots 90 to reduce friction. A pair of flat faced velocity gibs 92 are fixed to the cross bearing block 86 and spaced apart from one another a predetermined distance. The velocity gibs 92 are moveable with the cross bearing block 86 between a first terminal end stroke position, shown in FIG. 9, and a second terminal end stroke position, corresponding to FIG. 12 although the velocity gibs 92 are not illustrated there.

A pair of vertically extending slide tubes 94 are slideably disposed in the cross bearing block 86. An upper end piece 96 and a lower end piece 98 are fixedly attached to opposite ends of the slide tubes 94. A pair of flat faced tooling control gibs 100 are fixed at respective butt joints to the upper 96 and lower 98 end pieces. The columns 64, therefore, extend upwardly from the upper end piece 96 and support the worktool 22 for movement with the upper end piece 96. Hence, as the upper end piece 96 moves horizontally, the worktool 22 moves horizontally, and as the upper end piece 96 moves vertically, the worktool 22 likewise moves vertically.

The cam means 66 includes a velocity cam profile 104 disposed between the velocity gibs 92. The velocity cam 104 is of the constant breadth type wherein the flat faced velocity gibs 92 remain in perpetual contact with the velocity cam 104 throughout 360° rotation of the velocity cam 104.

Figure 5:
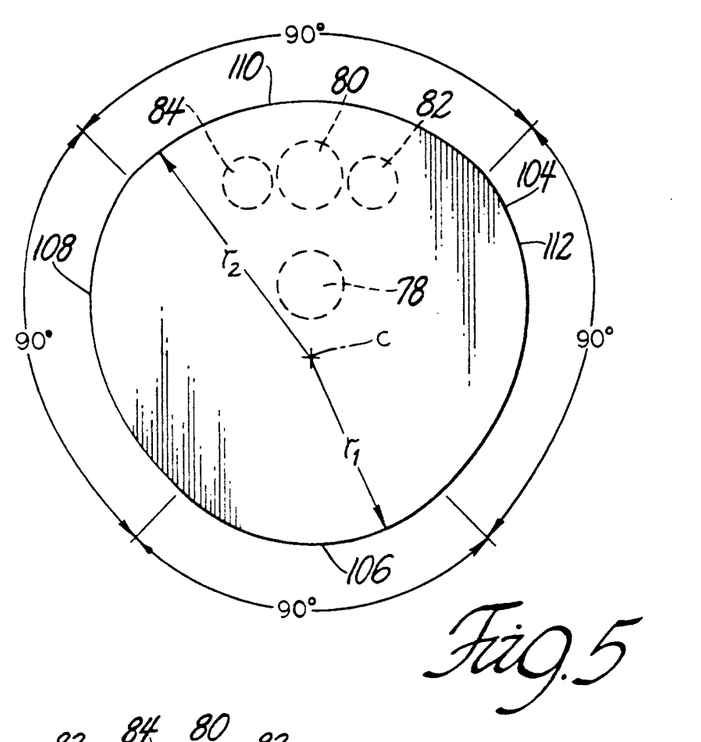
FIG. 5 is a front view of the velocity cam.

The general profile of the velocity cam 104 is shown in FIG. 5 including four −90° segments. The first segment comprises a base dwell 106 formed as a 90° circular arc about the cam axis C having a base circle radius r1. Adjacent clockwise to the base dwell portion 106 is a 90° first camming portion 108. Adjacent the first camming portion 108, in the clockwise direction, is an extended dwell portion 110. The extended dwell portion 110 is formed by a 90° circular arc having a radius r2 centered on the cam axis C. The distance between the base circle radius r1 and the extended dwell radius r2 is the displacement of the velocity cam 104, which displacement is hereinafter mathematically represented by S. Therefore, r2 minus r1, equals S. Completing the profile periphery of the velocity cam 104 is a 90° second camming portion 112. The velocity cam 104 is symmetrical about a vertical axis extending through the cam axis C, as shown in FIG. 4, so that the first camming portion 108 and the second camming portion 112 are mirror images of each other. This symmetry imparts identical movement to the velocity gibs 92 as the velocity cam 104 rotates about both the drive sprocket axis A and the idler sprocket axis B.

Figure 6:
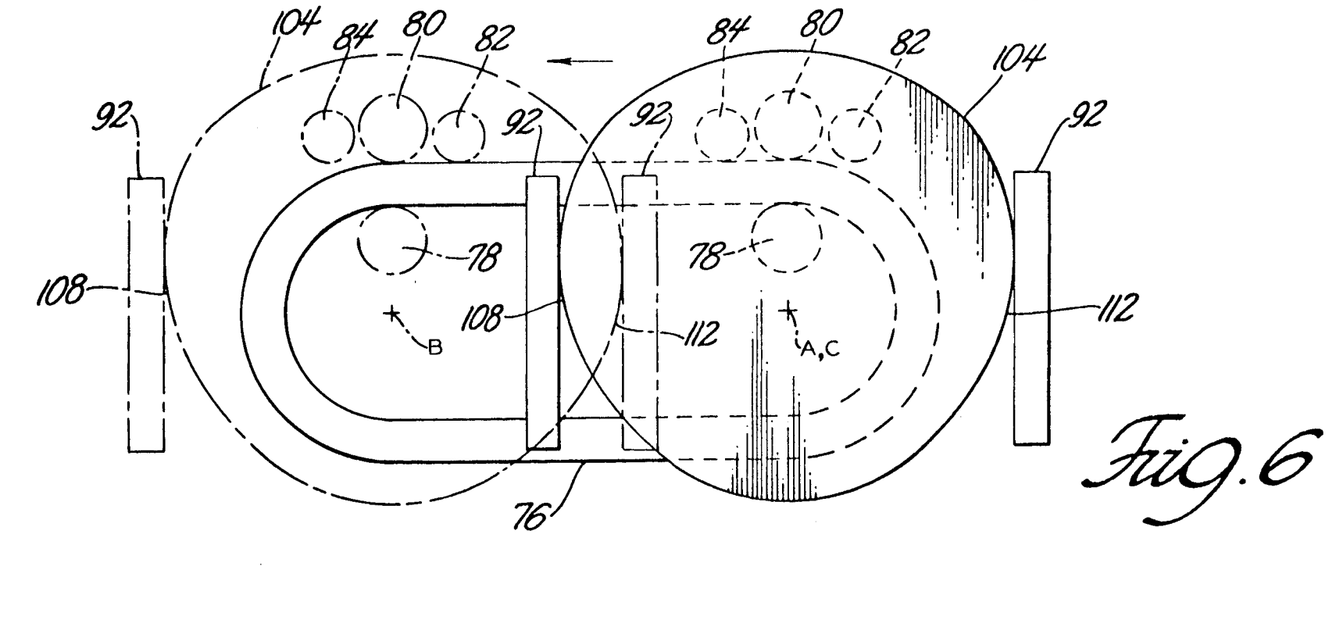
FIG. 6 is a simplified view of the velocity cam disposed between the velocity gibs with the velocity cam shifted to the left in phantom.
Figure 7:
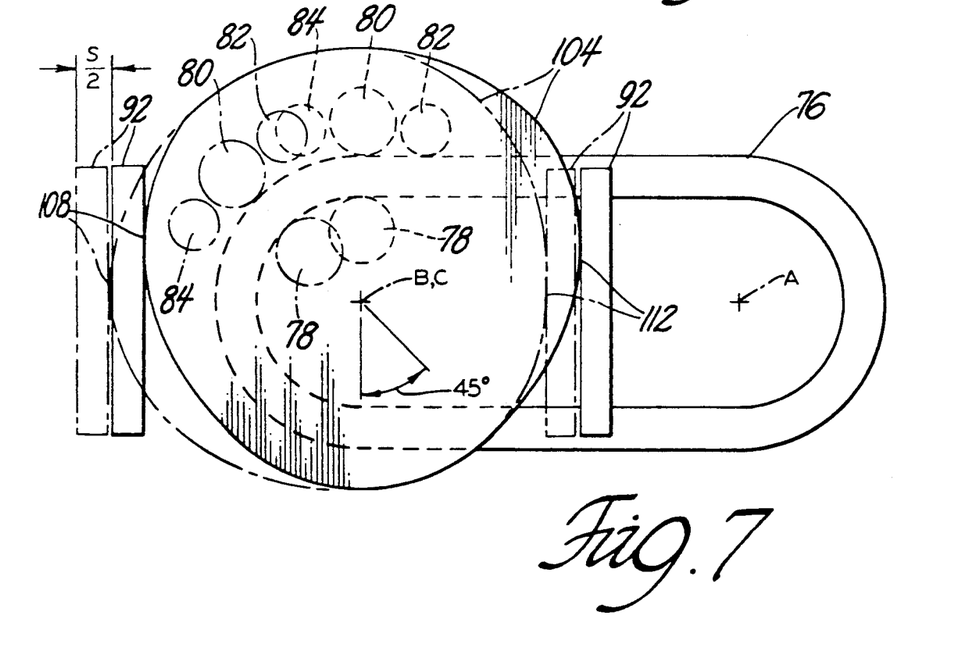
FIG. 7 a simplified view of the velocity cam as in FIG. 6, showing the velocity cam rotated 45° in phantom.
Figure 8:
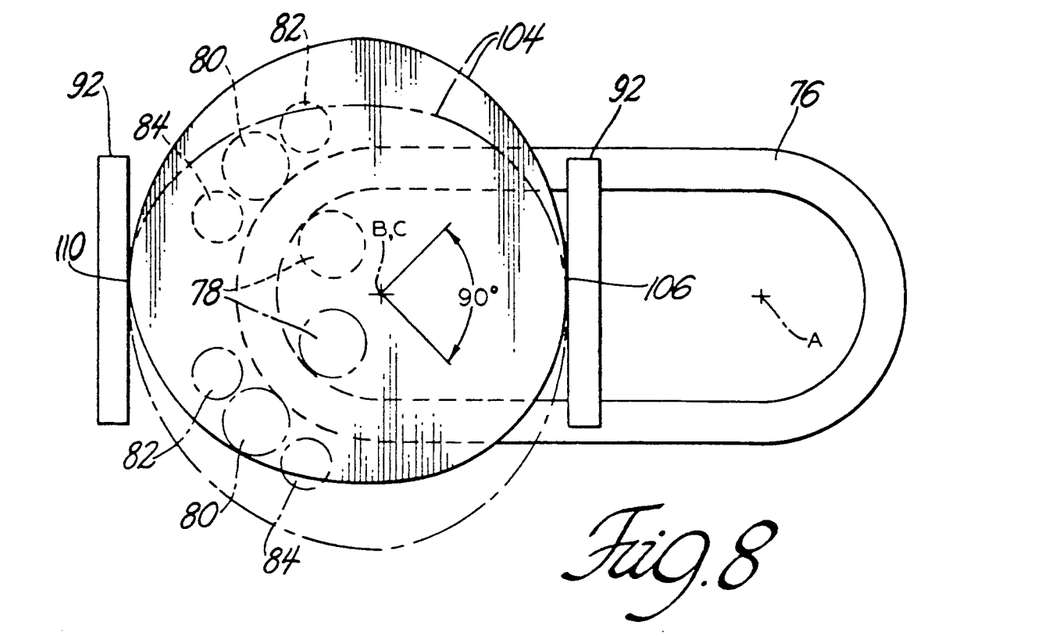
FIG. 8 is a simplified view of the velocity cam as in FIG. 7 s the velocity cam rotated 90° in phantom.
Figure 9:
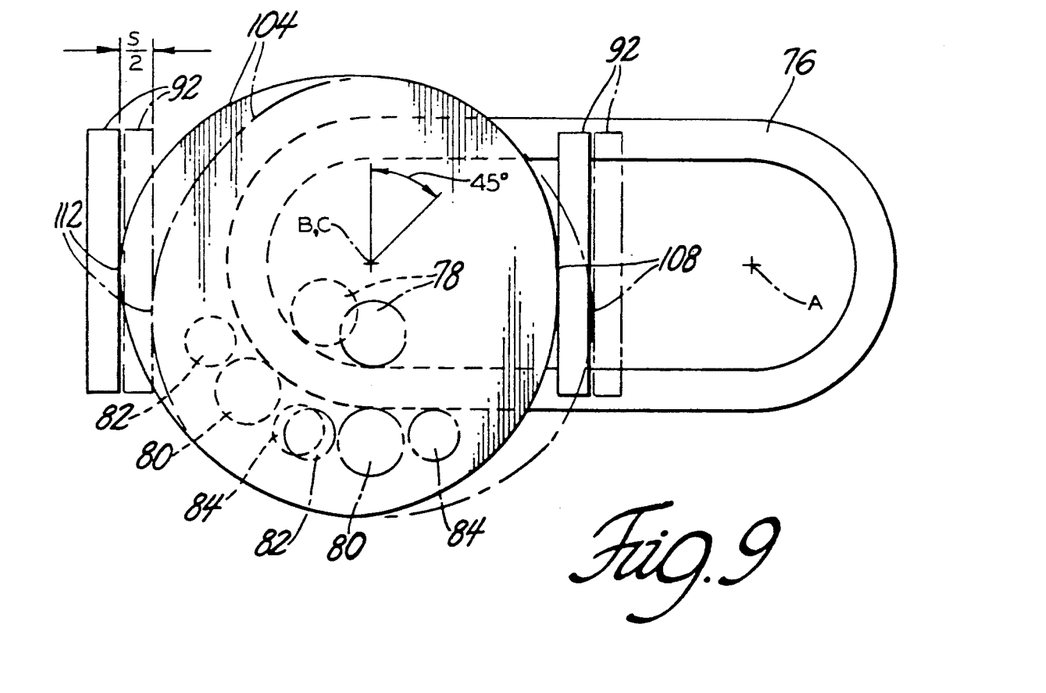
FIG. 9 is a simplified view of the velocity cam as in FIG. 8, the velocity cam rotated 45° in phantom.

In FIG. 6, for the sake of clarity, a simplified representation of the velocity gibs 92 is disposed in operative engagement with the velocity cam 104. FIG. 6, along with FIGS. 7-9, are viewed from the rear of the assembly 20 as illustrated in FIG. 1. Accordingly, the rollers 78, 80, 82, 84 are shown in hidden lines disposed in rolling engagement with the partially hidden track 76. As the velocity cam 104 moves with the discrete point 68 on the driven element 36, it is transferred leftwardly to the position shown in phantom in FIG. 6, at the same linear velocity as the driven element 36. Therefore, the velocity gibs 92 move from the position shown in solid to the position shown in phantom at the exact linear velocity as the discrete point 68 upon the driven element 36. Between the two positions shown in FIG. 6, the velocity cam 104 does not rotate about its cam axis C, but rather translates in a linear path. Therefore, when the velocity gibs 92 reach the position shown in phantom in FIG. 6, they are moving at a linear velocity equal to the linear velocity of the discrete point 68 on the driven element 36, which means that the worktool 22 is moved linearly therewith at the linear velocity of the driven element 36. In other words, the driven element 36 is in complete control of the worktool 22 throughout the movements shown in FIG. 6. During this movement, the velocity gibs 92 are in contact with the first 108 and second 112 camming portions of the velocity cam 104.

In FIG. 7, the velocity cam 104 is shown in solid corresponding to the phantom velocity cam 104 position of FIG. 6, where its pins 72 extend from the crank arm 70 at the transition point between the straight upper segment 38 and the left semi-circular segment 40 of the driven element 36. As the discrete point 68 begins to move about the outer periphery of the rotating idler sprocket 32, the velocity cam 104 will be forced to rotate therewith. The velocity cam 104 is shown in phantom rotated counterclockwise 45'. In both the solid and phantom positions shown in FIG. 7, the cam axis C is aligned with the idler sprocket axis B so that as the pins 72 rotate about the idler sprocket axis B, the velocity cam 104 is forced to rotate about the idler sprocket axis B.

When the velocity cam 104 rotates, as in FIG. 7, the velocity gibs 92 are displaced to the left (to the first terminal end stroke position) a distance equal to one half of the displacement, i.e., S/2, or one half of the distance between the base circle radius r1 and the extended dwell radius r2. The displacement is only half the full displacement S because the velocity gibs 92 engage the middle of the first 108 and second 112 camming portions prior to beginning rotation. Therefore, through the 45° rotation shown in FIG. 7, the velocity cam 104 has moved to a zero velocity corner defined as the transition point between the first camming portion 108 and the extended dwell 110, and the transition point between the second camming portion 112 and the base dwell 106.

During movement of the velocity gibs 92 from the position shown in solid in FIG. 7 to the position shown in phantom, the velocity gibs 92 have been smoothly decelerated from the linear velocity of the driven element 36 to zero velocity. In other words, control of the worktool 22 has been handed-over, as it were, from the driven element 36 to the velocity cam 104, and the velocity cam 104 has brought the horizontal motion of the worktool 22 to a gradual halt.

Figure 15:
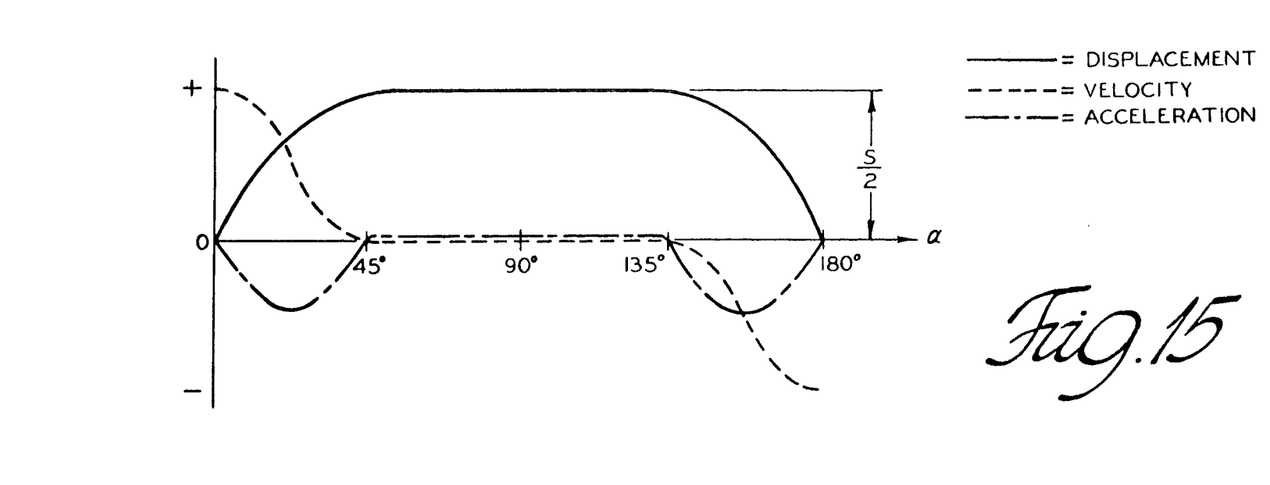
FIG. 15 is a graphic representation of the displacement, velocity, and acceleration imparted to the velocity gibs by the velocity cam moving as shown in FIGS. 7, 8 and 9.

FIG. 15 graphically illustrates the changes imposed on the velocity gibs 92 in the section of the curve between 0° and 45° along the abscissa. Along the abscissa, the degree of rotation of the velocity cam 104 is indicated. In FIG. 15, the solid line represents the displacement of the velocity gibs 92, in this case to the left. The graph illustrates that the ordinate displacement of the velocity gibs 92 is equal to S/2, or one half of the displacement of the velocity cam 104. As will be mathematically demonstrated subsequently, the displacement S/2 in the preferred embodiment of the subject invention is always less than the drive pitch radius Rs. The evenly broken line represents the linear velocity of the velocity gibs 92. At 0° rotation, corresponding to the velocity cam 104 as shown in solid in FIG. 7, the velocity gibs 92 have a positive velocity as shown in FIG. 15. This positive linear velocity gradually tapers to zero velocity in the region between 0° and 45° of velocity 104 rotation. The particular advantage of the subject invention is the smooth decrease in velocity during transfer of control over the velocity gibs 92 from the driven element 36 to the velocity cam 104. The smooth transfer of control prevent the worktool 22 from being jerked from one velocity to another. The unevenly broken line in FIG. 15 represents the linear acceleration of the velocity gibs 92, and illustrates that a smooth deceleration is provided between 0° and 45° of velocity cam 104 rotation. The velocity cam 104 is profiled to provide cycloidal motion output.

In FIG. 8, the velocity cam 104 is shown in solid corresponding to the phantom velocity cam 104 position of FIG. 7. The velocity gibs 92 are in the first terminal end stroke position. The velocity cam 104 is shown in phantom rotated 90° counterclockwise from that shown in solid. During the 90° rotation of the velocity cam 104 shown in FIG. 8, the velocity gibs 92 remain stationary as their flat engagement surfaces engage the base dwell portion 106 and the extended dwell portion 110 of the velocity cam 104. That is, the first 108 and second 112 camming portions of the velocity cam 104 profile do not contact the velocity gibs 102 between the two positions shown in solid and phantom in FIG. 8.

In solid, the velocity cam 104 is shown in FIG. 8 engaging the velocity gibs 92 at the first zero velocity corner, as described above in connection with FIG. 7. In the position shown in phantom in FIG. 8, however, the velocity cam 104 is shown rotated so that a second zero velocity corner is reached wherein the velocity gibs 92 engage the outer periphery of the velocity cam 104 at the transition between the first camming portion 108 and the first dwell portion 106, and also at the transition point between the second camming portion 112 in the extended dwell portion 110. At the first and second zero velocity corners, both the velocity gibs 92 and the tooling control gibs 100 are momentarily motionless.

Referring again to FIG. 15, the portion of the graph illustrated between 45° and 135° along the abscissa corresponds to the movement of the velocity gibs 92 between the solid and phantom positions shown in FIG. 8. Particularly, there is no further displacement of the velocity gibs 92, and therefore their velocity and acceleration are zero.

In FIG. 9, the velocity cam 104 is shown in solid corresponding to the phantom velocity cam 104 position of FIG. 8. The velocity cam 104 is shown in phantom rotated 45° counterclockwise from that shown in solid During this 45° rotation, the velocity gibs 92 are accelerated from zero velocity to the linear velocity of the driven element 36 in a smooth manner so that the worktool 22 is not jerked or shaken. More specifically, the velocity cam 104 is rotated so that the contact point between the velocity gibs 92 and the outer periphery of the velocity cam 104 moves from the second zero velocity corner to a position shown in phantom where the velocity gibs 94 are disposed midway between the first 108 and second 112 camming portions. During this movement, the velocity cam 104 is transferring control of the velocity gibs 92 back to the driven element 36 in a smooth manner.

Referring again to FIG. 15, the portion of the curve between 135° and 180° along the abscissa corresponds to the motion of the velocity cam as shown in FIG. 9. The displacement of the velocity gibs 92 is shown moving downwardly, in the opposite direction from that shown between 0° and 45° along the abscissa. The displacement of the velocity gibs 92 between 135° and 180° equals one half the total displacement of the velocity cam 104, i.e., S/2. The linear velocity of the velocity gibs 92 between 135° and 180° is shown moving from zero to a negative linear velocity. This is because the velocity gibs 92 are moving in the opposite direction from that shown in FIGS. 6 and 7. The acceleration of the velocity gibs 92 from zero velocity to the linear velocity of the driven element 36 is shown to be smooth in FIG. 15. Therefore, the worktool 22 is reaccelerated at a smooth, even rate to the exact velocity of the driven element 36 to prevent undesirable sudden jerky movements of the worktool 22.

From the position shown in phantom in FIG. 9, the velocity cam 104 and velocity gibs 92 are translated at the linear velocity of the driven element 36 toward the drive sprocket 28 were the velocity cam 104 will decelerate the velocity gibs 92 back down to zero, to the second terminal end stroke position, and then reaccelerate the velocity gibs 92 back to the linear velocity of the driven element 36 to return the velocity cam 104 and the velocity gibs 92 to position shown in solid in FIG. 5.

The cam means 66, as shown in FIGS. 1-3 and 10-14, also includes a tooling cam 114 disposed between the flat faces of the tooling control gibs 100 for controlling the vertical movement of the tooling control gibs 100, and hence the vertical movement of the worktool 22. The tooling cam 114 is a constant breadth cam and has a profile similar to that shown for the velocity cam 104 in FIG. 5. The dwells of the velocity cam 104 and the tooling cam 114 are matched so that in operation the zero velocity corners described above are reached at the same instant for both the velocity gibs 92 and the tooling control gibs 100.

Figure 10:
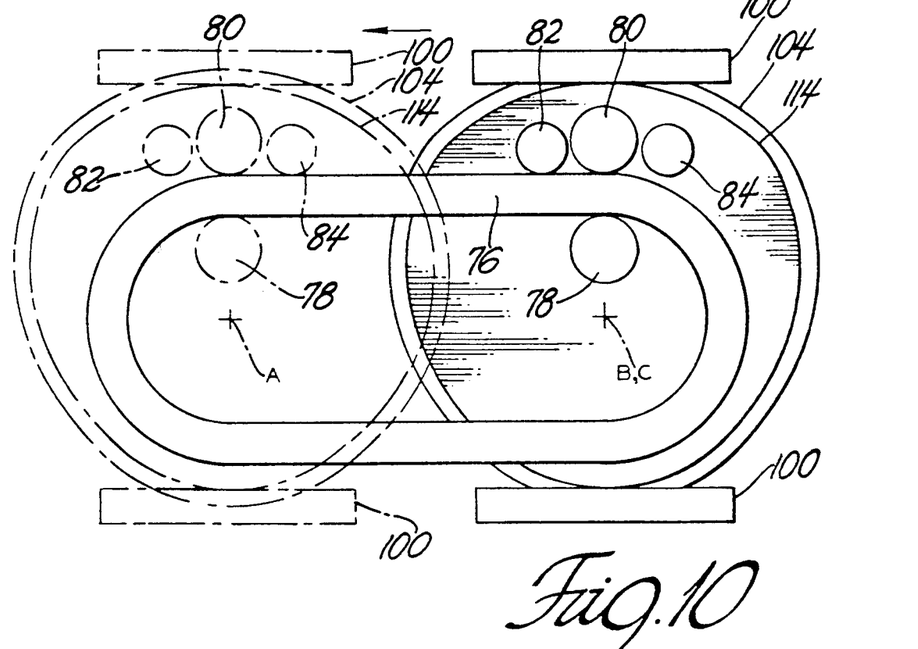
FIG. 10 is a simplified view of the tooling cam disposed between the tooling control gibs and shifted to the left in phantom.

In FIG. 10, the tooling cam 114 is shown moved with the tooling control gibs 100 to the position shown in phantom at the linear velocity of the driven element 36. For simplicity, the movements of the tooling cam 114 in FIG. 10 are intended to correspond to the movements of the velocity cam 104 shown in FIG. 6, although the Figures illustrate a reversal of direction of the driven element 36 since FIGS. 6 and 10 are drawn from opposite sides of the track 76. In other words, FIGS. 10-14 are viewed from the front of the assembly 20 as illustrated in FIG. 1, whereas FIGS. 6-9 are viewed from the rear of the assembly 20 illustrated in FIG. 1.

Figure 11:
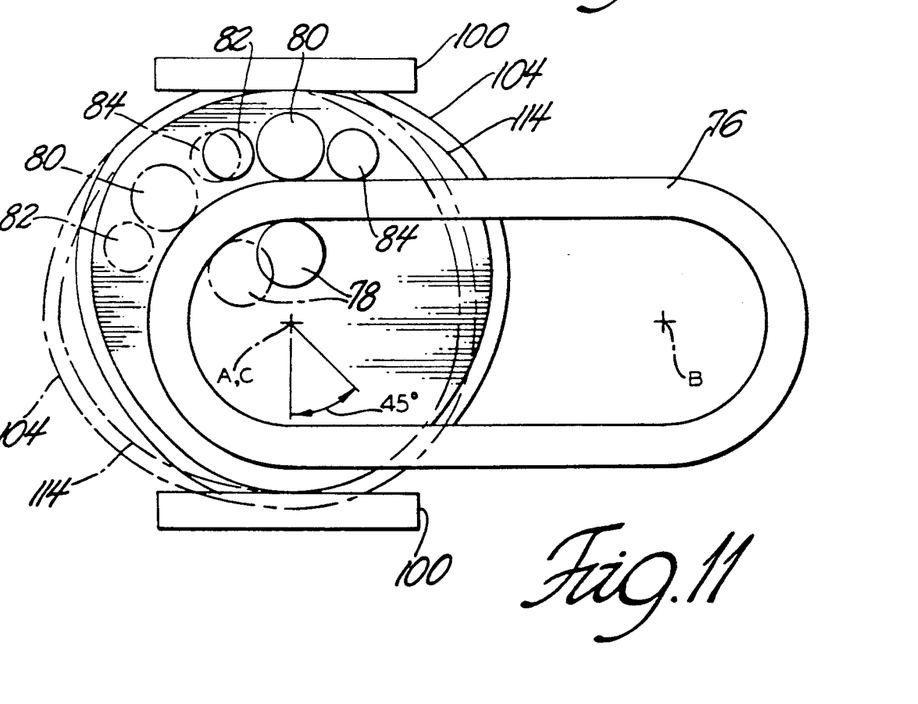
FIG. 11 is a simplified view of the tooling cam as in FIG. 10, showing the tooling cam rotated 45° in phantom.

In FIG. 11, the tooling cam 114 is shown in solid corresponding to the phantom tooling cam 114 of FIG. 10. The tooling cam 114 is rotated 45° counterclockwise in phantom. Because the tooling control gibs 100 are here in engagement with the dwell portions of the tooling cam 114, the first 45° of rotation shown in FIG. 11 does not vertically displace the tooling control gibs 100.

Figure 16:
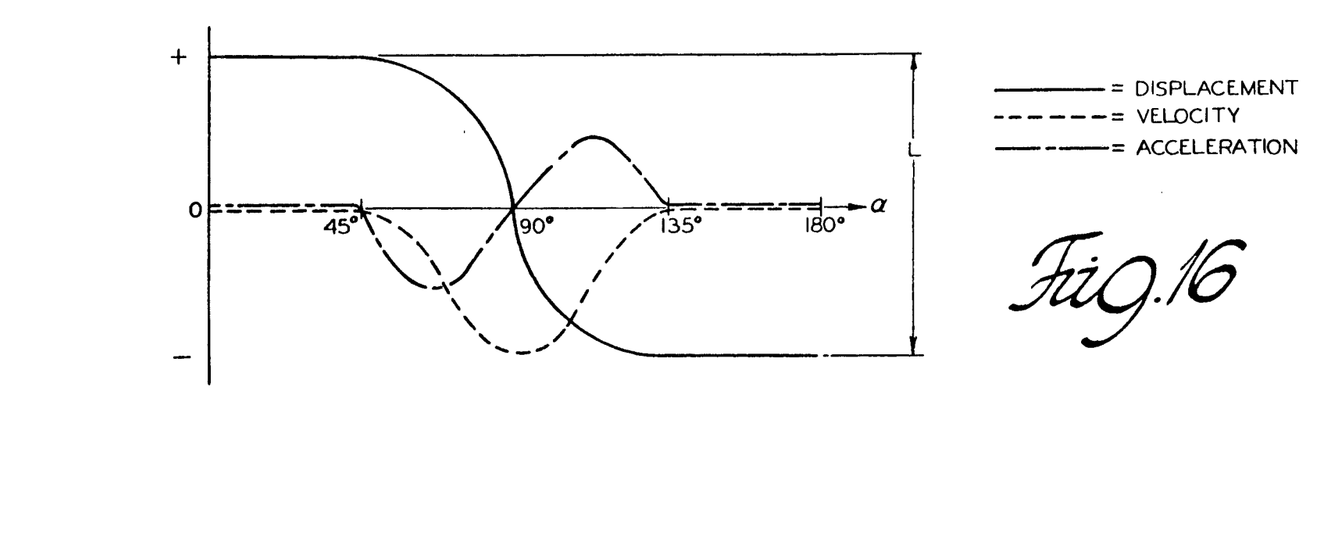
FIG. 16 is a graphic representation of the displacement, velocity, and acceleration imparted to the tooling control gibs by the tooling cam moving as shown in FIGS. 11, 12 and 13.

In FIG. 16, a graphic illustration of the movement of the tooling control gibs 100 is shown. The portion of the graph between 0° and 45° along the abscissa illustrates the movement of the tooling control gibs 100 between the solid and phantom positions in FIG. 11. Particularly, there is no displacement of the tooling control gibs 100 in this region, and so the velocity and acceleration are zero.

Figure 12:
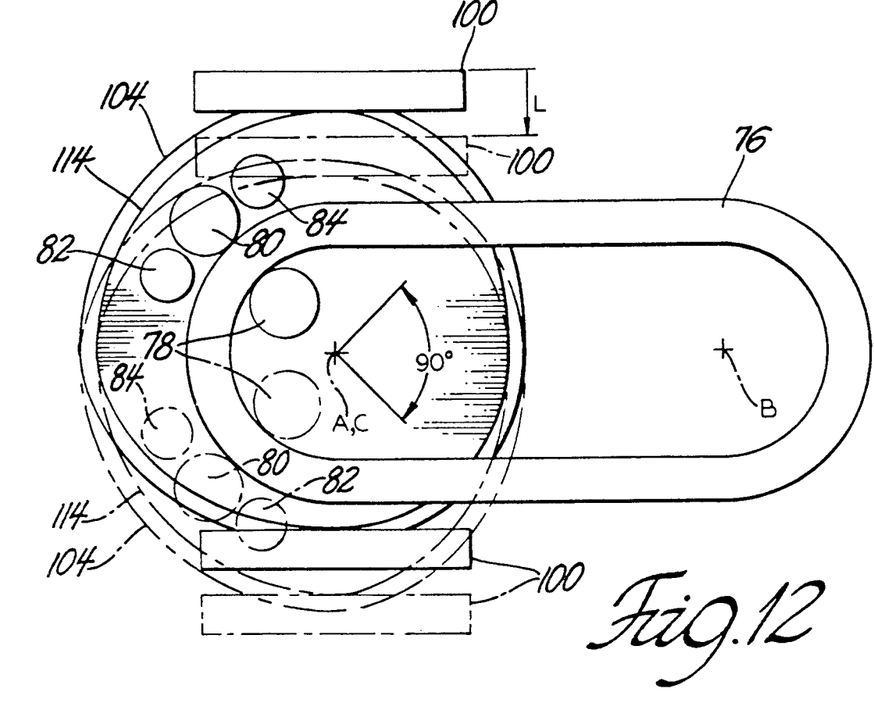
FIG. 12 is a simplified view of the tooling cam as in FIG. 11, the tooling cam rotated 90° in phantom.

In FIG. 12, the tooling cam 114 is shown in solid corresponding to the phantom tooling cam 114 of FIG. 11. In phantom, the tooling cam 114 is shown rotated 90° counterclockwise from the solid. During this 90° rotation of the tooling cam 114, the tooling control gibs 100 are displaced vertically downwardly a distance equal to the full displacement of the tooling cam 114.

In FIG. 16, the portion of the graph between 45° and 135° along the abscissa illustrates the displacement, velocity, and acceleration of the tooling control gibs 100 as the tooling cam 114 is rotated 90° between the solid and phantom positions shown in FIG. 12. During this 90° rotation, the tooling control gibs 100 are displaced vertically downwardly a distance represented by L. The tooling gibs 100 are accelerated from zero velocity at 45° to a maximum negative velocity at 90°, and then slowed back to zero velocity at 135°. Throughout this movement, the acceleration of the tooling control gibs 100 is smooth so that the worktool 22 is uniformly moved between the vertical positions.

Figure 13:
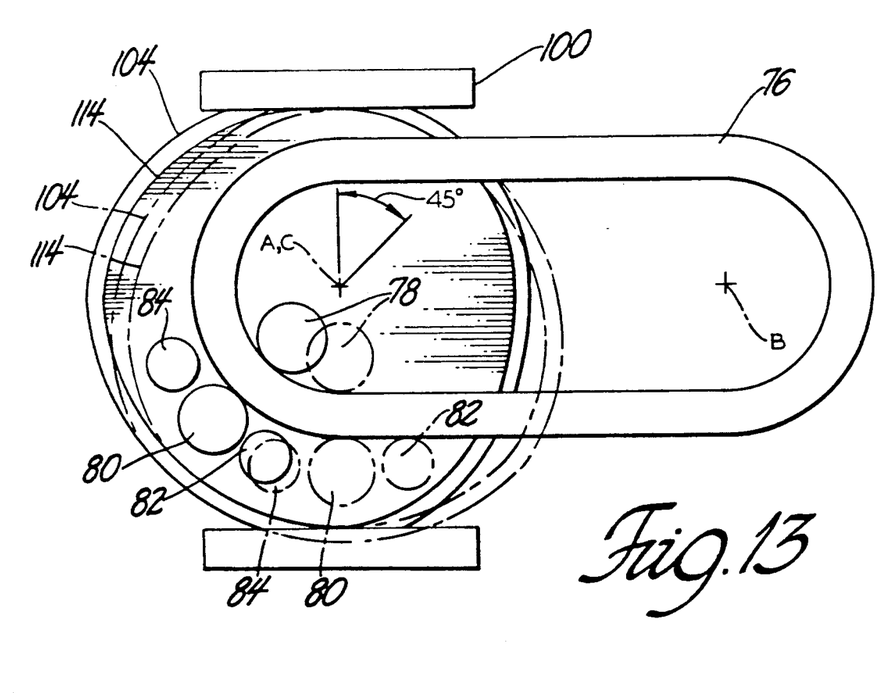
FIG. 13 is a simplified view of the tooling cam as in FIG. 12, showing the tooling cam rotated 45° in phantom.

In FIG. 13, the tooling cam 114 is shown in solid corresponding to the phantom tooling cam 114 of FIG. 12. The tooling cam 114 is rotated 45° in phantom, during which rotation the tooling control gibs 100 are stationary. FIG. 16 graphically represents the static behavior of the tooling control gibs 100 between 135° and 180° along the abscissa.

Figure 14:
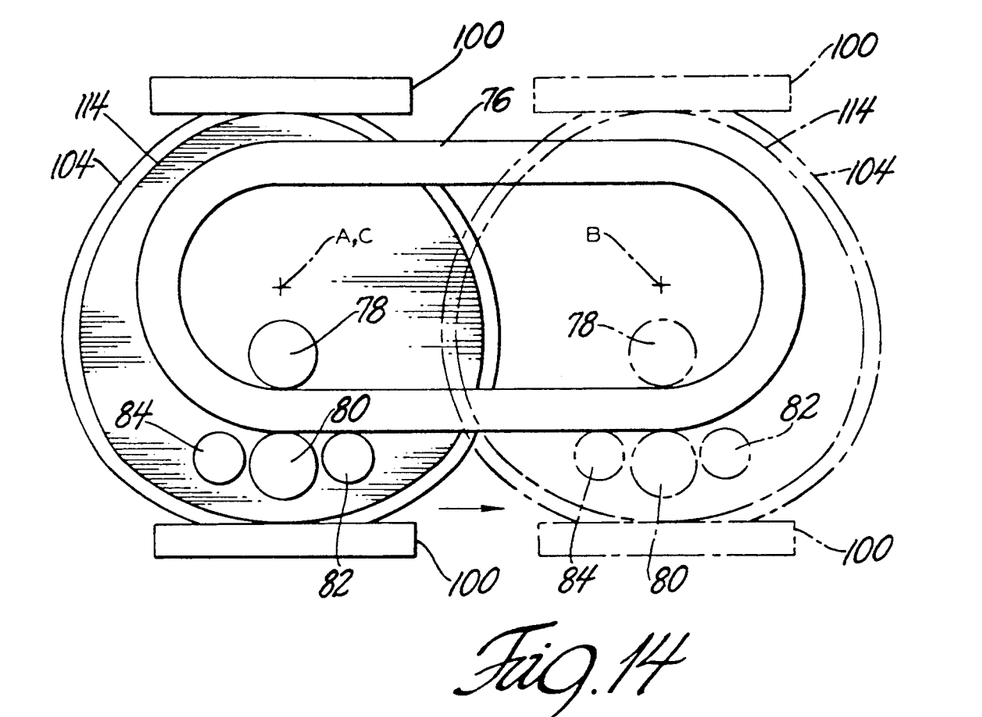
FIG. 14 is a simplified view of the tooling cam as in FIG. 13, showing the tooling cam shifted to the right in phantom.

FIG. 14 illustrates straight horizontal movement of the tooling control gibs 100 at a constant linear velocity equal to the linear velocity of the driven element 36. From the phantom position shown in FIG. 14, continued movement of the tooling cam 114 will cause it to rotate counterclockwise about the idler sprocket axis B, and displace the tooling control gibs 100 vertically upwardly to the position shown in solid in FIG. 10.

Because the dwells of the velocity cam 104 and the tooling cam 114 are matched, the square output motion of the worktool 22 shown in FIG. 4 is achieved. By varying the shape of the velocity cam 104 and/or the tooling cam 114, different output motions of the worktool 22 can be achieved.

The smooth deceleration and acceleration of the worktool 22 at the ends of its horizontal stroke are achieved by the specific profile of the velocity cam 104. More particularly, the displacement of the velocity cam 104 must be calculated so that the velocity gibs 92 are brought from the linear velocity of the driven element to zero velocity, or alternatively from zero velocity up to the linear velocity of the driven element 36, in a distance exactly half the displacement of the velocity cam 104, i.e., S/2.

Since, as shown in FIG. 15, the maximum velocity, either positive or negative, of the velocity gibs 92 is achieved exactly half way through the rise of the velocity cam 104. And since the first 108 and second 112 camming portions of the velocity cam 114 extend 90° about the periphery of the velocity cam 104, it can be simply deduced that the maximum velocity imparted to the velocity gibs 92 must occur at exactly 45° rotation of the velocity cam 104. Therefore, the displacement S of the velocity cam 104 is the critical element in smoothly decelerating the velocity gibs 92 from the linear velocity of the driven element 36 down to zero, and then reaccelerating the velocity gibs 92 from zero velocity back to the linear velocity of the driven element 36 at the terminal end strokes of the worktool 22.

In order to properly determine the required displacement of the velocity cam 104, the following mathematical equation has been developed:

$$S = \frac{(Rs)(a)(Pi)}{108\,(Cv)}$$

Where: S = the total displacement of the velocity cam 104 in inches,

Rs = the drive pitch radius of the drive sprocket 32, a = the minimum degree of velocity cam 104 rotation for the displacement S to occur, and Cv = the velocity coefficient of cam rotation.

As an example, for a standard 16 tooth RC40 chain sprocket, the pitch diameter is 2.563 inches. Therefore, dividing by two (2) to determine the drive pitch radius, Rs = 1.282 inches. In the preferred embodiment described above, total displacement of the velocity gibs 92 requires 90° rotation of the velocity cam 104. Therefore, a = 90. Pi is, of course, the ratio of the circumference of a circle to its diameter, and equals 3.14+. The velocity coefficient of cam rotation is a constant factor chosen with consideration for the particular application. Preferred is the maximum allowable velocity coefficient for cycloidal motion at one half stroke. As set forth in the Ferguson cam design manual, the maximum velocity coefficient is 2. Therefore, Cv = 2. Solving for the cam displacement:

$$S = \frac{(1.282)(90)(3.14)}{180(2)}$$

$$S = 1.0006 \text{ inches.}$$

Therefore, regardless of the linear velocity of the driven element 36, the velocity cam 104 must have a total displacement of 1.006 inches when the drive pitch radius Rs equals 1.282 inches. Accordingly, referring to FIG. 5, if a base circle radius r1 of the velocity cam 104 is chosen to be 2.500 inches, the extended dwell radius r2 must equal 3.506 inches. Because the tooling cam 114 is not required to blend the velocities of the tooling control gibs 100 with that of the driven element 36, the above equation is not required to determine its displacement.

Figure 17:
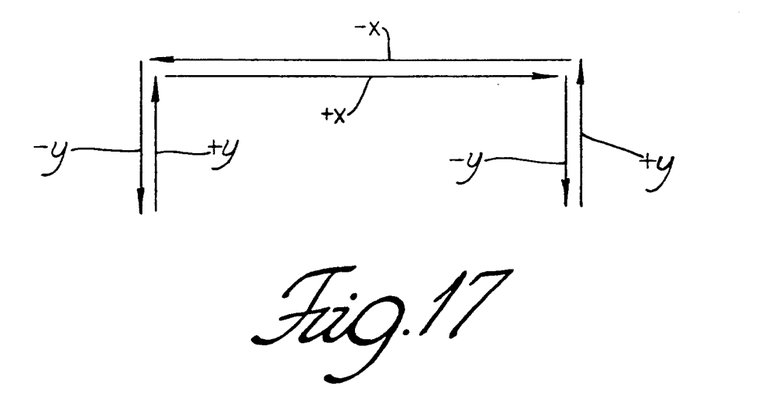
FIG. 17 is a diagrammatic representation of the motion imparted to the worktool according to an alternative embodiment of the tooling cam.
Figure 18:
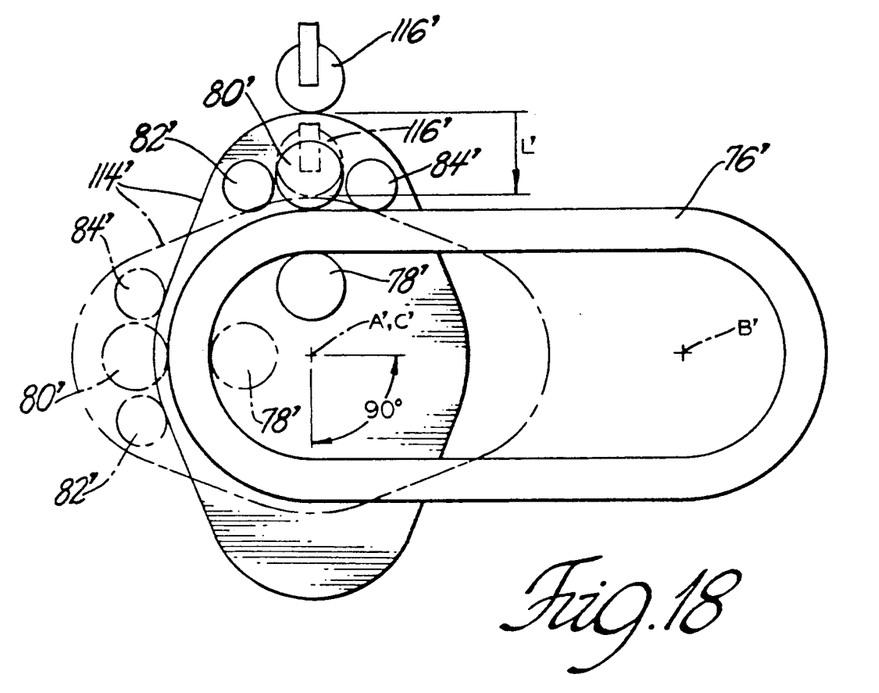
FIG. 18 is a simplified view of the alternative embodiment of the tooling cam, showing the tooling cam rotated 90° in phantom.
Figure 19:
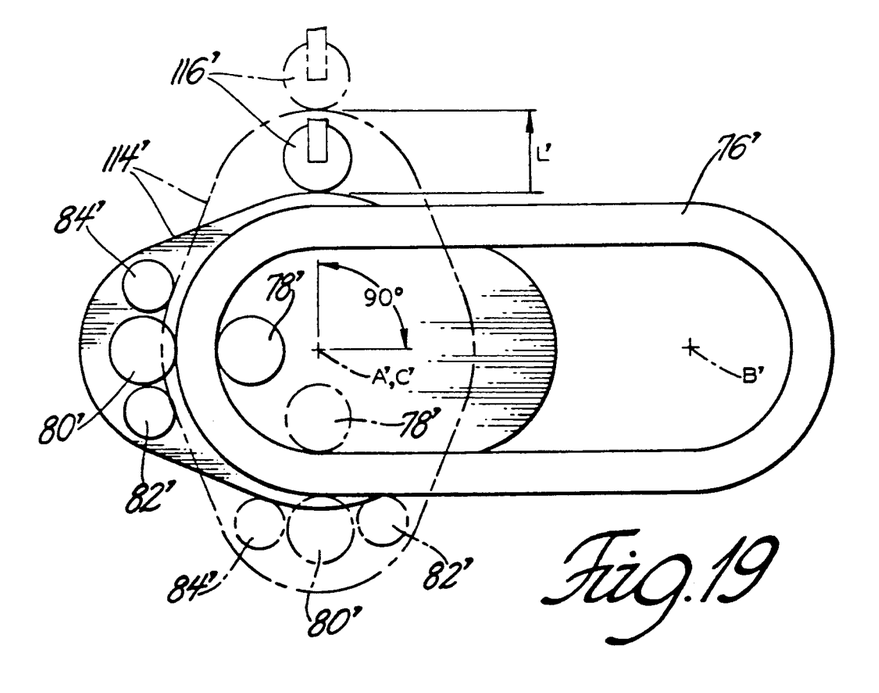
FIG. 19 is a simplified view of the embodiment of the tooling cam as in FIG. 18, showing the tooling cam rotated 90° in phantom.

DETAILED DESCRIPTION OF THE ALTERNATIVE EMBODIMENT OF FIGS. 17-19

As described above in connection with FIGS. 1-16, the worktool 22 comprises a walking beam generally required to describe a rectangular path of motion as shown in FIG. 4. However, the subject transfer apparatus 20 can be easily modified to change the motion of the worktool 22 to the generally U-shaped motion shown in FIG. 17, as is typical with a pick and place type transfer apparatus. Of course, other worktool 22 motions are possible by varying the shapes of the velocity cam 104 and the tooling cam 114.

In FIGS. 18 and 19, a modified tooling cam 114' is shown having a profile designed to generally produce the motions shown in FIG. 17. The alternative tooling cam 114' is not of the constant breadth type, and therefore the tooling control gibs 100 are replaced with a reciprocating roller follower 116'.

The operation of the velocity cam 104 and velocity gibs 92 are identical to that shown in FIGS. 5 through 15. However, FIGS. 18 and 19 illustrate the operation of the tooling cam 114' as it moves about the drive sprocket (not shown). In FIG. 18, the tooling cam 114' is shown with the roller follower 116' in the fully raised vertical position. The tooling cam 114' is shown rotated 90° in phantom with the roller follower 116' displaced vertically downwardly a distance L'.

In FIG. 19, the tooling cam 114' is shown in solid corresponding to the phantom tooling cam 114' of FIG. 18, and with the roller follower 116' disposed in the lowermost vertical position. The tooling cam, 114' is shown rotated 90° in phantom to displace the, roller follower 116' vertically upwardly again the distance L'. From this position, the tooling cam 114', along with the velocity cam 104 and the velocity gibs 92, are displaced to the right thus moving the worktool horizontally.

The subject invention is particularly adapted for displacing the worktool 22 very long horizontal distances. Accordingly, by simply moving apart the drive sprocket 28 and the idler sprocket 32, lengthening the driven element 36, and elongating the track 76, 76', the transfer apparatus 20, 20' can be made to displace the worktool 22 along virtually unlimited horizontal lengths.

By gradually decelerating the worktool 22 from the linear velocity of the driven element 36 to zero velocity at the ends of the horizontal strokes, and then reaccelerating the work tool 22 back to the linear velocity of the driven element 36, sudden and jerky movements are avoided and a more efficient, precise transfer operation is achieved.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

I claim:

1. A transfer apparatus for moving a worktool along a repeating general plane path, said apparatus comprising:

a drive sprocket;

an idler sprocket;

an endless chain operatively supported around said drive sprocket and said idler sprocket;

motor means for rotating said drive sprocket at a substantially constant angular velocity to impart a substantially constant linear velocity to said chain;

a pair of velocity gibs having a fixed spaced relation and unitarily moveable between first and second terminal end stroke positions in response to movement of said chain;

a constant breadth velocity cam operatively disposed between said velocity gibs and fixed to a discrete point on said chain for alternately smoothly accelerating and smoothly decelerating the movement of said velocity gibs between the linear velocity of said chain and zero velocity as said velocity gibs approach and depart from said first and second terminal end stroke positions to allow smooth reversal of direction of said velocity gibs and the worktool;

a pair of tooling control gibs having a fixed spaced relation and unitarily moveable with said velocity gibs while being independently moveable laterally of said velocity gibs;

and a tooling cam operatively disposed between said tooling control gibs and fixed to said velocity cam for movement therewith for laterally displacing said tooling control gibs while said velocity gibs remain at zero velocity to produce a generally rectangular output motion of the worktool.

2. A transfer apparatus for moving a worktool along a repeating general plane path, said apparatus comprising:

a drive sprocket;

an idler sprocket;

an endless chain operatively supported around said drive sprocket and said idler sprocket;

motor means for rotating said drive sprocket at a substantially constant angular velocity to impart a substantially constant linear velocity to said chain;

pair of velocity gibs having a fixed spaced relation and unitarily moveable between first and second terminal end stroke positions in response to movement of said chain;

a constant breadth velocity cam operatively disposed between said velocity gibs and fixed to a discrete point on said chain for alternately smoothly accelerating and smoothly decelerating the movement of said velocity gibs between the linear velocity of said chain and zero velocity as said velocity gibs approach and depart from said first and second terminal end stroke positions to allow smooth reversal of direction of said velocity gibs and the worktool;

a pair of tooling control gibs having a fixed spaced relation and unitarily moveable with said velocity gibs while being independently moveable laterally of said velocity gibs;

and a tooling cam operatively disposed between said tooling control gibs and fixed to said velocity cam for movement therewith for laterally displacing said tooling control gibs while said velocity gibs remain at zero velocity to produce a generally rectangular output motion of the worktool.

* * * * *